No. 4,654. Reissued Dec. 5, 1871.

Mary F. Crocker. Administratrix de bonis non of the Estate of Wm. R. Crocker. Mach. for making Corks.

WITNESSES

A. M. Malcomson Jr.

James H. Hunter

INVENTOR.

Mary F. Crocker

Administratrix de bonis non of the Estate of Wm. R. Crocker, decd. by Cochrane & Todd Attorneys.

AM. PHOTO-LITHOGRAPHIC CO. N.Y. SEBONEK'S PROCESS.

UNITED STATES PATENT OFFICE.

MARY F. CROCKER, OF WEST WINSTED, CONNECTICUT, ADMINISTRATRIX OF ESTATE OF WILLIAM R. CROCKER, DECEASED.

IMPROVEMENT IN MACHINES FOR MANUFACTURING CORKS.

Specification forming part of Letters Patent No. 13,714, dated October 30, 1855; extended seven years from October 30, 1869; reissue No. 4,654, dated December 5, 1871.

*To all whom it may concern:*

Be it known that WILLIAM R. CROCKER, of West Winsted, in the county of Litchfield and State of Connecticut, did invent certain new and useful Improvements in Machines for Manufacturing Corks; and I do hereby declare the following to be a full, clear, and exact description thereof, which will enable those skilled in the art to make and use the same, reference being had to the accompanying drawing forming part of this specification, in which drawing—

Figure 1:
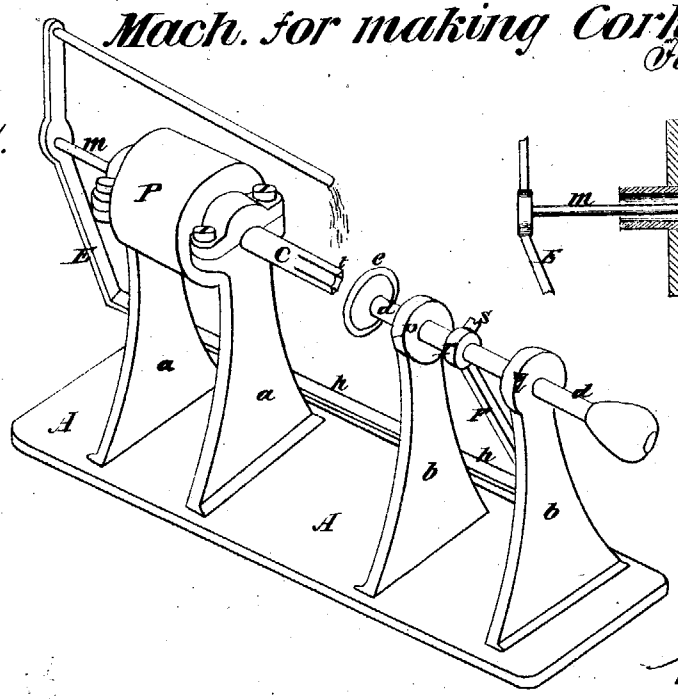
Figure 2:
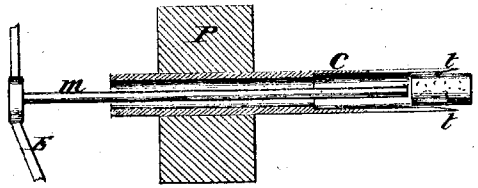

Figure 1 is a perspective view of a cork-cutting machine constructed according to his improvements, and Fig. 2 is a longitudinal central section of the cutting-cylinder and mechanism used for releasing the corks therefrom.

In order to produce a cork perfect in its manufacture there must be what is termed a draw-cut. The nature of cork-wood is such that any other cut in the production of the cork will either tear or haggle it and give it an unmerchantable appearance. No machine has been heretofore invented with a construction and mode of operation which will properly secure this result. His improvements to effect this object consist, first, in a cylindrical cutter containing a circular knife-edge at and around the end which first enters the cork-wood, having a revolving motion given to it by any known means of gearing, in connection with a rod contained within the said cylinder to aid in ejecting the cork after such cork is cut by the edge of the revolving cylinder acting as a knife operated on a shear cut.

In the drawing illustrating his improvements, A is the base plate of the machine. *a a* and *b b* are the stands or supports for the operating parts. The stands *a a* support the journals of the revolving shaft or cutter *c*, and *b b* support the sliding shaft *d d*. The cylindrical cutter *c* is hollow and has a circular knife-edge at end *t*. This cylindrical cutter is designed to receive a rotary or revolving motion. The portion of the cylinder designed to cut through the block of cork should be made as thin as possible consistent with strength, and a slight taper be given to the outside, commencing a sufficient distance from the end to insure a good cutting-edge. The hollow portion should be uniform in size from the cutting-edge the distance, at least, if not more so, of the length of the longest cork, to be cut back toward the rear portion; and the exterior surface uniform, or nearly so, until the taper of the cutting-edge is met. In case it is desired to cut a tapering form of cork, this end of the cylindrical cutter is constructed with a number of longitudinal slits running back from the cutting-edge *t* nearly the length of the cork required to be cut. The diameter of the hollow part of the cylindrical cutter should correspond with the diamter of the cork to be cut, or, in case of a tapering cork, with the largest diameter. Between the journals *a a* is a pulley, P, made fast to the cylindrical cutter by a set-screw in order that a belt may be attached for the purpose of giving a rapid rotary motion to the cutter. The space occupied by the journals and pulley may be made a little smaller both externally and internally, as it is not necessary to maintain its full size except so far as is required for the proper cutting and receiving of the cork. *d d* is a sliding shaft having bearings in the stands *b b*, and so resting on such bearings as to slide freely therein. *m* is a rod passing into and along the interior of the hollow cylindrical cutter, and attached at the exterior end to an arm, E. This arm extends down to a horizontal rod, *h*, which last-mentioned rod connects with another arm, F, which latter is attached at its other end by a sleeve or band, *r*, and set-screw *s*, to a point on the sliding shaft *d d* between its bearings on the stands *b b*. When the sliding shaft *d d* is moved the frame F *h* E and the sliding rod *m* have a corresponding motion given them at same time. At the end of the sliding shaft *d d* nearest the cylindrical cutter is placed a surface, such as a disk, *e*, against which to rest the block of cork-wood to be cut. The arm F is connected with the sliding shaft *d d* in such position that the band *r* will strike the stand at *p* without allowing the disk *e* to come in contact with the knife-edge of the cutter; and the band *r* will also strike the other stand at *q* without allowing the extremity of the rod *m* to pass beyond the cutting-edge of the cylinder C toward the cutting-disk *e*.

The operation of this machine is as follows:

A block of cork-wood, being between its parallel faces of the length of the cork to be cut, is held against the face of the disk *e;* by moving forward the shaft *d d* the block of cork-wood is brought in contact with the cutter of the hollow cylinder, which latter is made to revolve rapidly on its bearings, and a cork is cut and received into the cavity of the cylinder. By drawing back the shaft *d d* the rod *m*, which was moved out of the way of the cork-wood entering the revolving cylindrical cutter during the forward motion of the shaft *d d*, is made to bear against the cork and force it out at the cutting-end of the revolving-cylinder. In Fig. 2 is seen a cork within the cutting-cylinder being ejected at the cutting-end. This cutting and ejecting of the cork can be performed in a rapid manner by the attaching of power to the shaft *d d*, proper gearing being connected to such shaft. The machine, by reason of its ejecting each cork as fast as cut at the end at which the cork enters, can be run continuously without the danger of the revolving cylinder choking or fouling.

In the cutting of tapering corks the operation is as follows: The cutter is slit substantially as shown at Fig. 1 in the drawing, but otherwise about the same as usual for cylindrical corks. These slits cause the lips of the cutter, which lips are very thin and have a spring-temper and a slight bevel along them down to the edge, to be crowded together the moment the piece of cork-wood is commenced to be cut by the revolving cutter, and penetrating on a bevel the lips continue, necessarily, to approach closer to each other as the rear surface of the cork-wood is reached. By the time the cutting operation has ceased the smallest diameter of the cork required is obtained, the limits of this contraction being the bringing together closely of the lips, which may be varied by the number and width of the slits between the lips, according to the taper required for the cork about to be cut. When the corks require to be very tapering a greater number of slits should be made in the cutter in order that it may contract the more rapidly in its operation of cutting the cork. At the upper extremity of the arm E there may be placed a rod parallel to the revolving cylindrical cutter, and having yarn-cloth or other like material for carrying oil onto the cutter.

I disclaim the devices shown in the English patent of 1840, No. 8,395, for improved method of cutting corks; but claim—

1. The combination of the cylindrical cutter, constructed and cutting as described, and having a revolving motion, with a rod operating, substantially as described, to aid in ejecting the cork after the cork is cut by said cylindrical cutter.

2. The slitted cylindrical cutter, substantially as described.

3. The combination of the cylindrical cutter with a rod contained within the same, the latter being connected to and operating with the sliding shaft for bringing up the block of cork-wood to be cut, substantially as described.

MARY F. CROCKER,
*Administratrix.*

Witnesses:
GEO. M. WOODRUFF,
J. W. WHEELER.

(175)